Feb. 28, 1956 L. SACHSINGER 2,736,251
PHOTOGRAPHIC ROLL FILM CAMERA
Filed Aug. 4, 1951
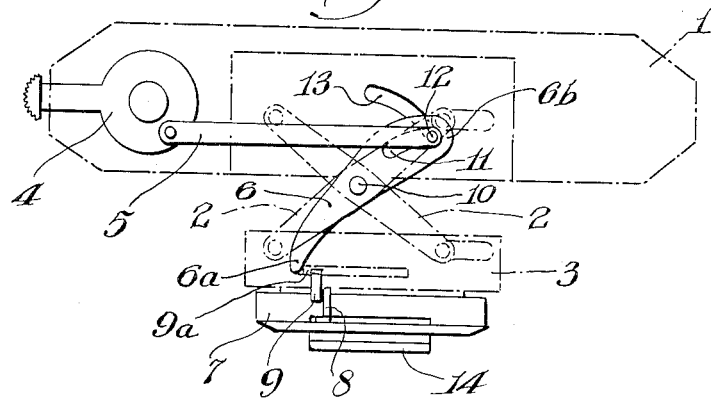
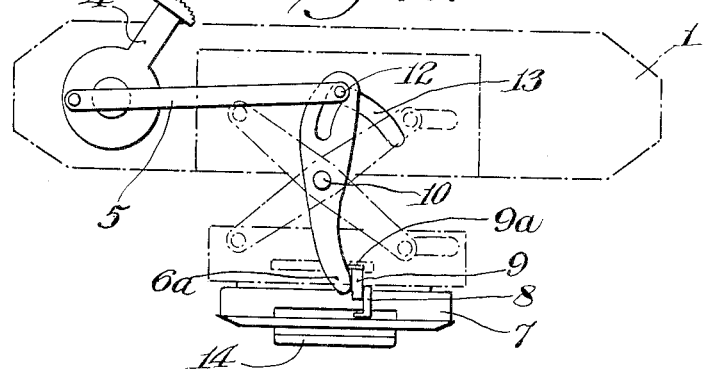
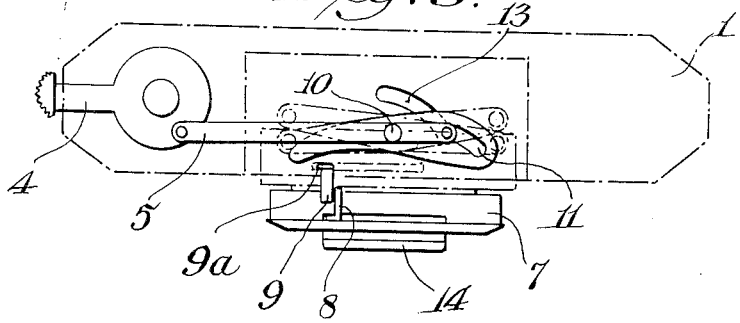
INVENTOR:
LUDWIG SACHSINGER
BY
Connolly and Hutz
HIS ATTORNEYS

United States Patent Office 2,736,251
Patented Feb. 28, 1956

2,736,251

PHOTOGRAPHIC ROLL FILM CAMERA

Ludwig Sachsinger, Munich, Germany, assignor to Agfa Camera-Werk Aktiengesellschaft, Munich, Germany, a corporation of Germany Application August 4, 1951, Serial No. 240,311

Claims priority, application Germany August 12, 1950

4 Claims. (Cl. 95—32)

My invention relates to a folding photographic roll film camera, preferably a miniature picture camera, having a device for simultaneous transport of the film and tensioning of the extensible central shutter.

Cameras of the aforesaid type are known. However, it was heretofore only possible to effect a satisfactorily operating, motion terminating connection between the fixed camera casing and the movably guided shutter housing, by providing many complicated working parts. In the case of box cameras or miniature picture cameras having a focal plane shutter, the transmission between the film transport device and the shutter tensioning device does not make great difficulties, because with these camera types all of the transmitting means are mounted within the camera casing itself, and also the space required for disposing of the transmitting parts does not create so great a problem as in the case of a camera whose central shutter must first be brought into the picture-taking position by the pulling out of a tube or of a bellows and lever system. In the picture-taking position such a shutter must, furthermore, be guided movably, in order to permit close adjustment of the lens.

These substantial difficulties have been eliminated according to my invention by providing that a single, two-armed lever constitutes the motion determining connection between the film transport device lying within the camera casing and the separate, movably guided central shutter. According to the invention this power transmission lever is mounted rotatably upon a lever of the camera folding system. Preferably the crossing point of the folding levers serves as the mounting for the two-armed transmission lever. The burdened arm of said lever stands in connection with the tensioning device for the extensible central shutter, whereas the power arm carries a curved slit into which grips the free end of a pull rod actuated by the film transport device. A bolt arranged on the pull rod, furthermore, grips into a guiding curve arranged at the camera casing. This guiding curve serves to guide the pull rod bolt during the swinging of the transmission lever and to support it, whereas the curved slit in the transmission lever permits a folding together of the camera without making it necessary to dissolve the motion terminating connection between the film transport device and the shutter tensioning device. By a special formation of the curved slit and of the guide curve, it is possible to change the transmission relationship between the film transport path and the shutter tensioning path, because the actuating point of the power arm is variable.

My invention is not limited to folding cameras having a film transport lever, and it may also be applied to such cameras whose take-up spool is directly actuated by means of a knob.

In the accompanying drawings an embodiment of the invention is illustrated by way of example. In these drawings:

Fig. 1 shows somewhat diagrammatically a folding, photographic roll film camera having a coupling between the film transport device and the extended shutter, in a position of rest, Fig. 2 shows the camera, after tensioning of the shutter and transport of the film; however, before releasing the actuating lever, and Fig. 3 shows the camera in its folded condition.

The camera casing 1, the folding levers 2, as well as the shutter carrier 3, are drawn in broken lines, whereas the parts necessary for an understanding of the invention, such as, for example, the film transport lever 4, the pull rod 5, the transmission lever 6 and the central shutter 7 are drawn in full lines. In Fig. 1 the camera is illustrated in the untensioned condition of the shutter. The shutter tensioning lever 8 lies against an intermediate ring 9. This intermediate ring is bent upwardly in a right angle at its rear end 9a and lies against the front end 6a of the transmission lever 6. The bent-up portion 9a is so long that it lies against the end 6a of the lever 6 in both the untensioned and tensioned conditions of the shutter. This is important, since the intermediate ring 9 that is mounted coaxially with the shutter opening, carries out a turning movement, while the transmission lever 6 that is mounted about the crossing point 10 of the folding levers 2, is moved linearly.

The rear arm 6b of the transmission lever 6 is provided with a curved slit 11 into which grips a peg 12 that is arranged at the end of the pull rod 5. This peg 12 on the pull rod 5 also grips into a guide curve 13 that lies fixedly in the camera casing 1. For transporting the film, the transport lever 4 is moved from the position shown in Fig. 1 to that shown in Fig. 2. Upon this movement the peg 12 on the pull rod 5 slides along the guide curve 13 and moves the transmission lever 6 into the position shown in Fig. 2. The front arm 6a of the transmission lever 6 thereby tensions the central shutter 7 by means of the intermediate ring 9 and the shutter tensioning lever 8. The intermediate ring 9 serves to maintain contact between the lever arm 6 and the shutter tensioning lever 8, also when the central shutter 7 together with the lens 14 are moved outwardly in the direction of the optical axis for the purpose of close adjustment.

The slit 11 in the rear lever arm 6b of the transmission lever 6 performs the function of making possible a folding together of the camera without interrupting the motion terminating connection between the film transport device and the shutter tensioning device. Upon folding together of the camera, the peg 12 on the pull rod 5 slides in the slit 11 of the transmission lever 6 so far forwardly that it takes up the position shown in Fig. 3. As may be seen from Fig. 3, the transmission lever 6 swings into the camera casing in the same manner as the folding levers 2, so that it lies almost parallel to the front wall of the camera.

With this construction it is readily possible to bring about the exposure readiness of the camera by means of spring operated folding levers, i. e. to move the lens shutter automatically into the infinity position, by means of a spring, since the transmission lever is guided into the ready position together with the folding levers.

I claim:

1. A folding roll film camera including a camera body having an extensible central shutter mechanism comprising a lazy tongs linkage, a pivot means mounted upon said lazy tongs linkage, a motion transmitting lever for tensioning said shutter mechanism, said lever being rotatably mounted upon said pivot means, a film transport means mounted upon said camera body, a linking member coupled to said film transport means, peg and slot means, said linking member being coupled to said lever by said peg and slot means to operatively couple said transport means to said lever, a guide means disposed on said camera body, said peg being operatively coupled with said guide means, and said guide means and said slot having cooperative shapes for conditioning said peg and slot means and said lever to transmit motion from said transport means to tension said shutter mechanism when said camera is unfolded and to fold said lever when said camera is folded.

2. A camera comprising the combination set forth in claim 1 wherein said lazy tongs linkage includes a pivoted crossing point, and said motion transmitting lever is rotatably mounted upon said crossing point.

3. A camera comprising the combination set forth in claim 1 wherein said lever includes a slot, and said linking member is comprised of a pull rod including a peg, said peg being disposed within said slot.

4. A camera comprising the combination set forth in claim 3 wherein said guide means is comprised of a guide curve disposed on said camera body, and said peg is engaged to move within said guide curve.

References Cited in the file of this patent

UNITED STATES PATENTS

| | | |
|---|---|---|
| 2,176,493 | Fuerst | Oct. 17, 1939 |
| 2,233,006 | Goldhammer | Feb. 25, 1941 |
| 2,464,790 | Bolsey | Mar. 22, 1949 |

FOREIGN PATENTS

| | | |
|---|---|---|
| 610,591 | Germany | Mar. 13, 1935 |
| 840,595 | France | Jan. 16, 1939 |
| 504,499 | Great Britain | Apr. 26, 1939 |
| 900,333 | France | Sept. 25, 1944 |
| 907,301 | France | June 18, 1945 |